(12) United States Patent
Core Almarza et al.

(10) Patent No.: US 7,673,937 B2
(45) Date of Patent: Mar. 9, 2010

(54) SIDE AIRBAG FOR RECLINING SEATS

(75) Inventors: Emiliano Core Almarza, Valladolid (ES); María Díez Barbero, Valladolid (ES)

(73) Assignee: Dalphi Metal Espana S.A., Madrid (ES)

( * ) Notice: Subject to any disclaimer, the term of this patent is extended or adjusted under 35 U.S.C. 154(b) by 0 days.

(21) Appl. No.: 12/157,199

(22) Filed: Jun. 6, 2008

(65) Prior Publication Data
US 2008/0309133 A1    Dec. 18, 2008

(30) Foreign Application Priority Data
Jun. 11, 2007    (EP) .................................. 07381045

(51) Int. Cl.
*B60N 2/42* (2006.01)
(52) U.S. Cl. .............................. 297/216.1; 297/216.15; 280/730.2
(58) Field of Classification Search .............. 297/216.1, 297/216.15, 284.9, 284.11; 280/730.1, 730.2
See application file for complete search history.

(56) References Cited
U.S. PATENT DOCUMENTS

| | | | | | |
|---|---|---|---|---|---|
| 5,651,582 | A | * | 7/1997 | Nakano | 297/216.13 |
| 5,908,219 | A | * | 6/1999 | Bohmler | 297/216.1 |
| 6,050,635 | A | * | 4/2000 | Pajon et al. | 297/216.1 |
| 6,244,656 | B1 | * | 6/2001 | Mueller | 297/216.13 |
| 6,715,788 | B2 | * | 4/2004 | Saiguchi et al. | 280/730.1 |
| 6,752,454 | B2 | * | 6/2004 | Ruel et al. | 297/216.1 |
| 7,490,900 | B2 | * | 2/2009 | Szczudrawa | 297/284.9 |
| 2006/0250000 | A1 | * | 11/2006 | Fischer et al. | 297/216.1 |

* cited by examiner

*Primary Examiner*—Peter R. Brown
(74) *Attorney, Agent, or Firm*—Ladas & Parry LLP

(57) ABSTRACT

The present invention relates to a side airbag module intended for holding back, in the event of an impact, the occupant (13) of the seat (15) of an automotive vehicle with a reclining backrest (19) by means of suitable means including an adjustment knob (31), comprising a cushion (11) configured for being vertically deployed between the protection area required for the occupant (13) and the body of the vehicle when inflated with the gas provided by a gas generator and a distance piece (21) joined at one of its ends (23) to the cushion (11) and at the other end (25) to the reclining means of the backrest (19) such that its length is reduced when the inclination of the backrest (19) is increased so that the deployed cushion (11) can be properly positioned no matter what the required inclination of the backrest (19) of the seat (15) may be.

6 Claims, 2 Drawing Sheets

SIDE AIRBAG FOR RECLINING SEATS

FIELD OF THE INVENTION

The present invention relates to an airbag module intended for holding back the occupants of a vehicle in the event of a side impact and more particularly to a side airbag module provided for reclining seats.

BACKGROUND OF THE INVENTION

Side airbags intended for protecting the pelvis and/or chest and/or head of the occupants of automotive vehicles in the event of side impacts are well known in the art.

In this sense, side airbag modules located in the door of the vehicle are known in which the inflating means cause the cushion to be deployed upward such that it opens out over the window of the vehicle, thereby preventing the occupant from impacting against elements of the door and holding back his or her head so that it does not come out of the window. By way of example of airbag modules with these features, those described in patents EP 0590845, EP 686531, EP 703123, EP 844948, EP 857621 and EP 988185 can be mentioned.

Side airbag modules located in the seat of the vehicle either in the backrest such as, for example, the one described in patent GB 2322338, or in its lower part such as, for example, the one described in document WO 97/04995, have also been proposed.

These and other documents of the prior art show different ways of achieving deployment of the cushion which effectively protects the pelvis and/or chest and/or head of the occupants of automotive vehicles in the event of side impacts, such as dividing the cushion into compartments for a more effective protection of each of the mentioned members or using independent gas sources such that, for example, the area for protecting the chest inflates before the area provided for protecting the head.

However, known side airbags do not provide a satisfactory solution for being suitably positioned and effectively protecting the occupant of a reclining seat in the different positions that the backrest of the seat can adopt.

The present invention is intended for solving this drawback.

SUMMARY OF THE INVENTION

The present invention proposes a side airbag module intended for holding back, in the event of an impact, the occupant of an automotive vehicle with a reclining backrest, i.e. a collapsible backrest with respect to the lower part or bench of the seat by operating suitable means which are associated to an adjustment knob for adjusting the degree of inclination of the backrest.

The airbag module comprises a cushion configured for being vertically deployed between the occupant and the body of the vehicle when inflated with the gas provided by a gas generator such that it protects the occupant of the seat, and a distance piece joined at one of its ends to the cushion and at the other end to said reclining means of the backrest such that its length is reduced when the inclination of the backrest is increased so that the deployed cushion can be properly positioned no matter what the inclination of the backrest of the seat.

In a preferred embodiment, the cushion is incorporated in the bench of the seat of the vehicle and the distance piece is joined to a reel integral with the adjustment knob for adjusting the inclination of the backrest of the seat. The seat in turn incorporates specific means for controlling the position of the distance piece both when the cushion is folded and during its deployment.

Other features and advantages of the present invention will be deduced from the following detailed description of an illustrative and by no means limiting embodiment of its object in relation to the attached drawings.

DETAILED DESCRIPTION OF THE INVENTION

Figure 1:
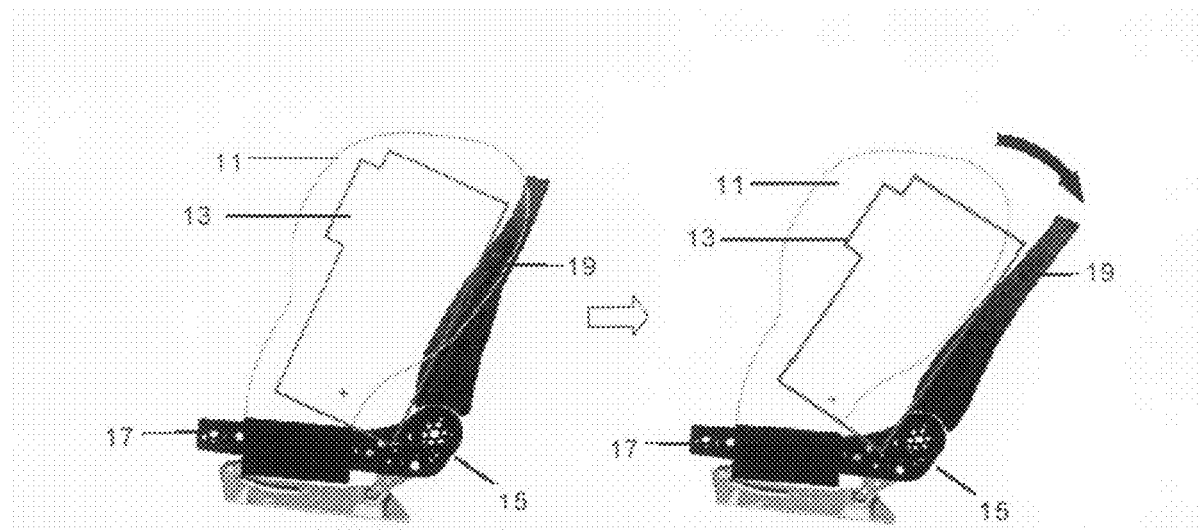
FIG. 1 is a schematic view of an automobile seat with the cushion of an airbag module known in the art in the deployed state in two inclination positions of its backrest.

According to FIG. 1, it is observed that in the airbag module known in the art the cushion 11 is deployed from the bench 17 of the seat 15 of the vehicle and suitably covers the protection area required for the occupant 13 of the vehicle when the backrest 19 of the seat 15 has the degree of inclination shown on the left-hand side of FIG. 1, but it does not do this when the backrest 19 of the seat has the degree of inclination shown on the right-hand side of FIG. 1.

Figure 2:
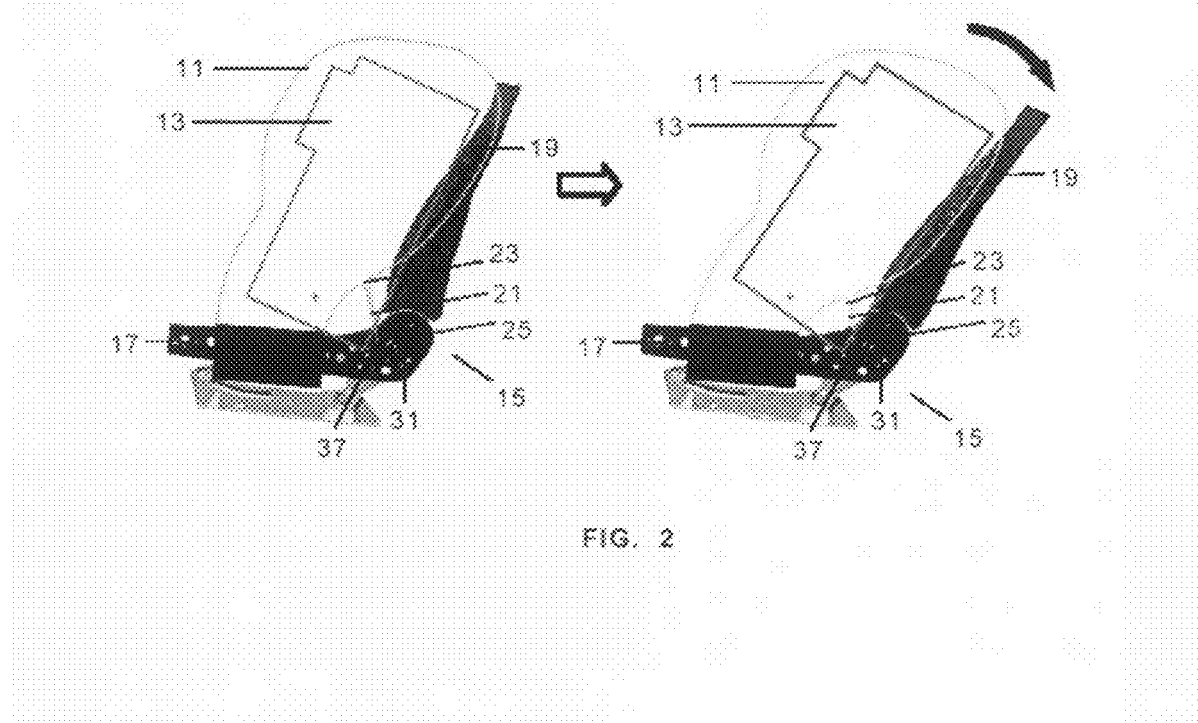
FIG. 2 is a schematic view of an automobile seat with the cushion of an airbag module according to the present invention in the deployed state in two inclination positions of its backrest.

FIG. 2 shows an airbag module according to a preferred embodiment of the invention which, with respect to that shown in FIG. 1, incorporates a distance piece 21 joined at one end 23 to the cushion 11 and at the other end 25 to the means for inclining the backrest 19 of the seat 15 to which the adjustment knob 31 is associated. In the degree of inclination of the backrest 19 of the seat 15 shown on the left-hand side of FIG. 2, the position of the cushion 11 is the same as in FIG. 1, but when the backrest 19 of the seat has the degree of inclination shown on the right-hand side of FIG. 2, the cushion 11 effectively protects the occupant because since the length of the distance piece 21 is reduced, the cushion 11 is forced to integrally follow the backrest 19 whatever its inclination may be. This reduction of the length of the distance piece 21 occurs because the operation of the adjustment knob 31 to increase the inclination of the backrest 19 of the seat 15 is associated to the winding of part of the distance piece 21 in the means for inclining the backrest 19.

Figure 3:
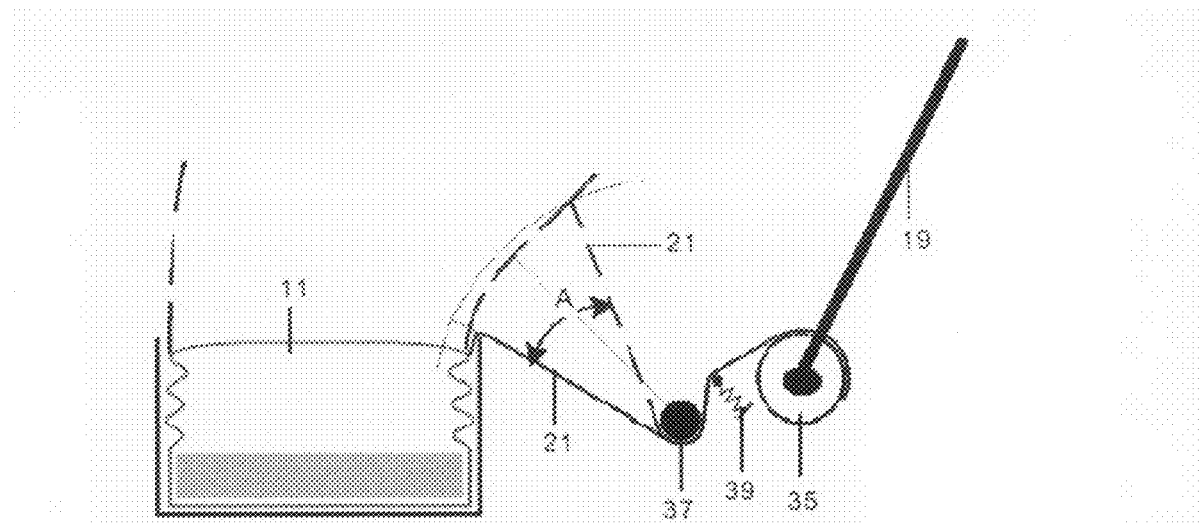
FIG. 3 is a schematic view of an airbag module according to the present invention showing the means used for controlling the positioning of the deployed cushion in relation to the inclination of the backrest of the seat.

It is observed in FIG. 3 that the distance piece 21, which can be made of fabric or another suitable material and the length of which is determined such that it is possible to keep the cushion 11 in the desired position when it is deployed and according to the degree of inclination required according to the position of the backrest of the seat, is wound in a reel 35 integral with the adjustment knob 31 the diameter of which is sized such that the desired reduction of the length of the distance piece 21 in relation to the degree of inclination of the backrest 19 occurs.

In order to control the position of the distance piece 21 in the different states of the cushion 11, the seat 15 includes a bar 37, located between the area of the seat incorporating the cushion 11 in the folded state and the reel 35, which determines the center of the arc A defined by the distance piece 21 when the cushion 11 is deployed, and a tension device 39 to keep the distance piece 21 withdrawn when the cushion 11 is folded.

Figure 4:
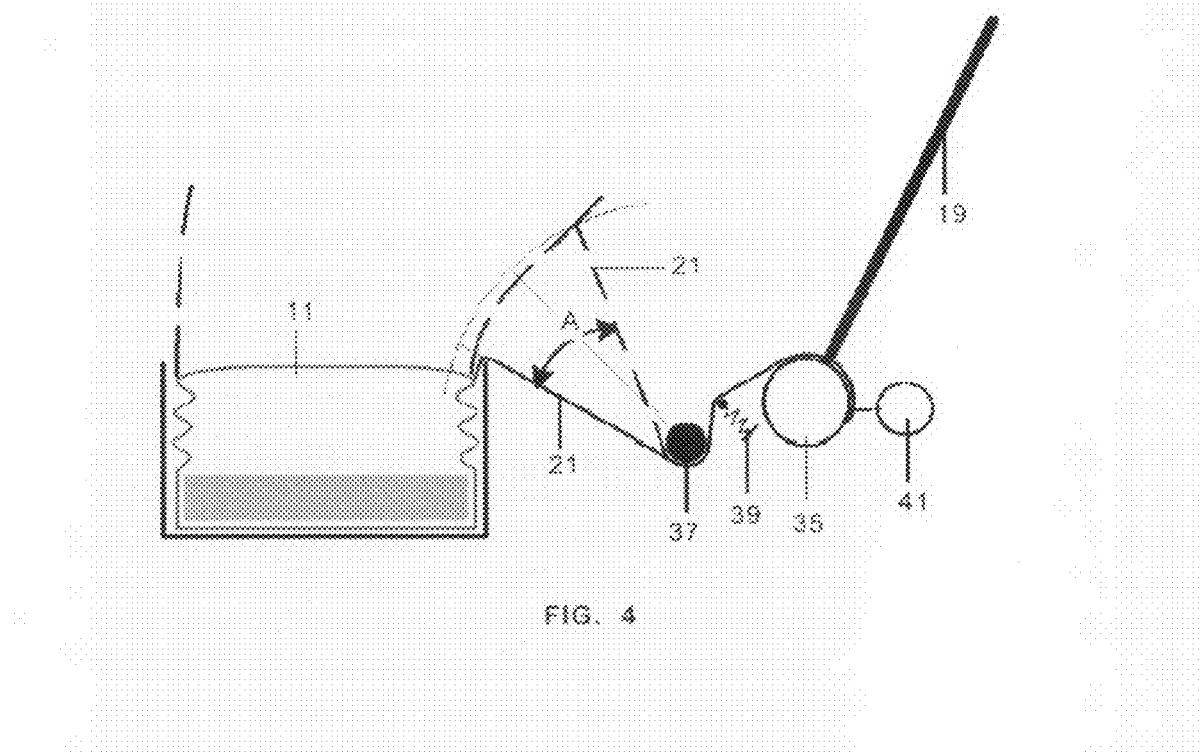
FIG. 4 is a schematic view of an airbag module according to the present invention in an automobile seat having a motor to recline the backrest of the seat.

The reel 35 can be operated manually or by means of an electric motor 41 as shown in FIG. 4.

FIG. 2 shows an airbag module according to the invention with the cushion 11 incorporated in the bench 17 of the seat 15 and configured to protect the pelvis-chest-head area of the occupant, but as a person skilled in the art will understand, the present invention also comprises airbag modules for protecting both the pelvis-chest-head area of the occupant as well as other parts thereof, and particularly the pelvis-chest, chest-head and chest areas.

The advantages set forth by the present invention include the following:

Ensuring the correct position of the cushion in deployment.

Mechanically modifying the position of the cushion to any required degree of inclination of the backrest ensuring the full functionality of the airbag in any of its positions.

Enabling suitable positioning of the cushion without needing to modify the position of the airbag module, which means a substantial mechanical simplification and significant economic savings.

Providing an airbag module provided with a sturdy positioning device in relation to a reclining backrest of a seat.

Although several embodiments of the invention have been described, it is obvious that modifications comprised within the scope thereof can be introduced, as the scope should not be considered to be limited to said embodiments but rather to the content of the following claims.

The invention claimed is:

1. A side airbag module intended for holding back an occupant (13) of a seat (15) of an automotive vehicle with a reclining backrest (19) in the event of an impact, the airbag module comprising an inflatable air bag cushion (11) configured for being vertically deployed between the protection area required for the occupant (13) and the body of the vehicle when inflated with a gas provided by a gas generator, the seat (15) comprising an adjustment knob (31) associated with reclining means used for reclining the backrest (19), and further comprising an elongated strap (21) joined at one of its ends (23) to the inflatable air bag cushion (11) and at the other end (25) to said reclining means for reclining the backrest (19) such that its length is reduced when inclination of the backrest (19) is increased so that the deployed inflatable air bag cushion (11) joined to the one end (23) of the elongated strap (21) and thereby following the movement of the one end (23) caused by the length reduction of the elongated strap (21) can be positioned in accordance with the inclination of the backrest (19) of the seat (15).

2. A side airbag module according to claim 1, wherein the inflatable air bag cushion (11) in the deployed state is incorporated in a bench (17) of the seat (15) of the vehicle, said reclining means for reclining the backrest (19) includes a reel (35) to which an end (25) of the elongated strap (21) is attached, and further comprising a bar (37) located between a bench area (17) of the seat (15) incorporating the inflatable air bag cushion (11) and said reel (35) for forming a center of an arc-like movement of and thereby controlling the position of the elongated strap (21) during the deployment of the inflatable air bag cushion (11), and a tension device (39) located between the bar (37) and said reel (35) for tensioning and thereby keeping the elongated strap (21) withdrawn when the inflatable air bag cushion (11) is in an un-deployed state.

3. A side airbag module according to claim 2, wherein said reclining means for reclining the backrest (19) include an electric motor (41).

4. A side airbag module according to claim 3, wherein the airbag module is configured to protect one of the following areas of members of the occupant: chest, pelvis-chest, chest-head, pelvis-chest-head.

5. A side airbag module according to claim 2, wherein the airbag module is configured to protect one of the following areas of members of the occupant: chest, pelvis-chest, chest-head, pelvis-chest-head.

6. A side airbag module according to claim 1, wherein the airbag module is configured to protect one of the following areas of members of the occupant: chest, pelvis-chest, chest-head, pelvis-chest-head.

* * * * *